No. 884,679. PATENTED APR. 14, 1908.
J. F. POKORNEY.
RACK FOR FARM WAGONS.
APPLICATION FILED MAR. 5, 1907.
2 SHEETS—SHEET 2.
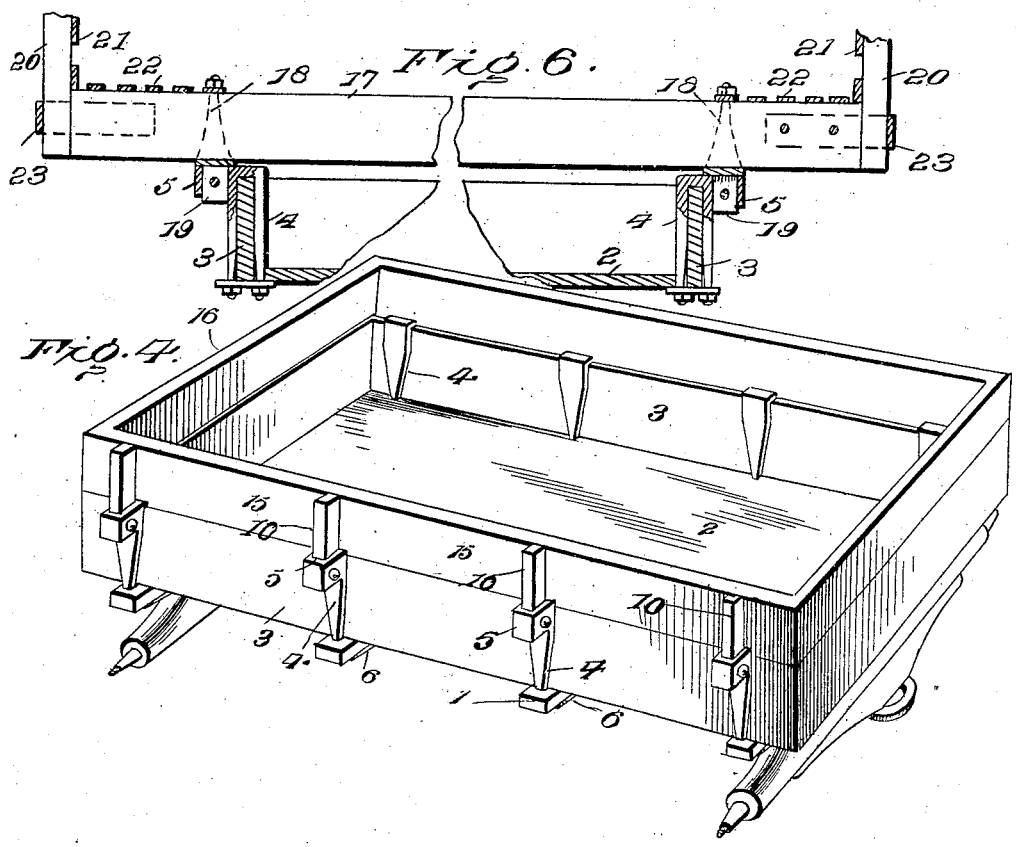
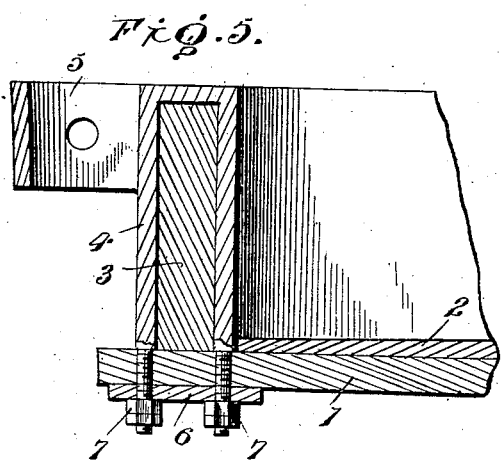
Witnesses
Inventor
J. F. Pokorney
By
Attorneys

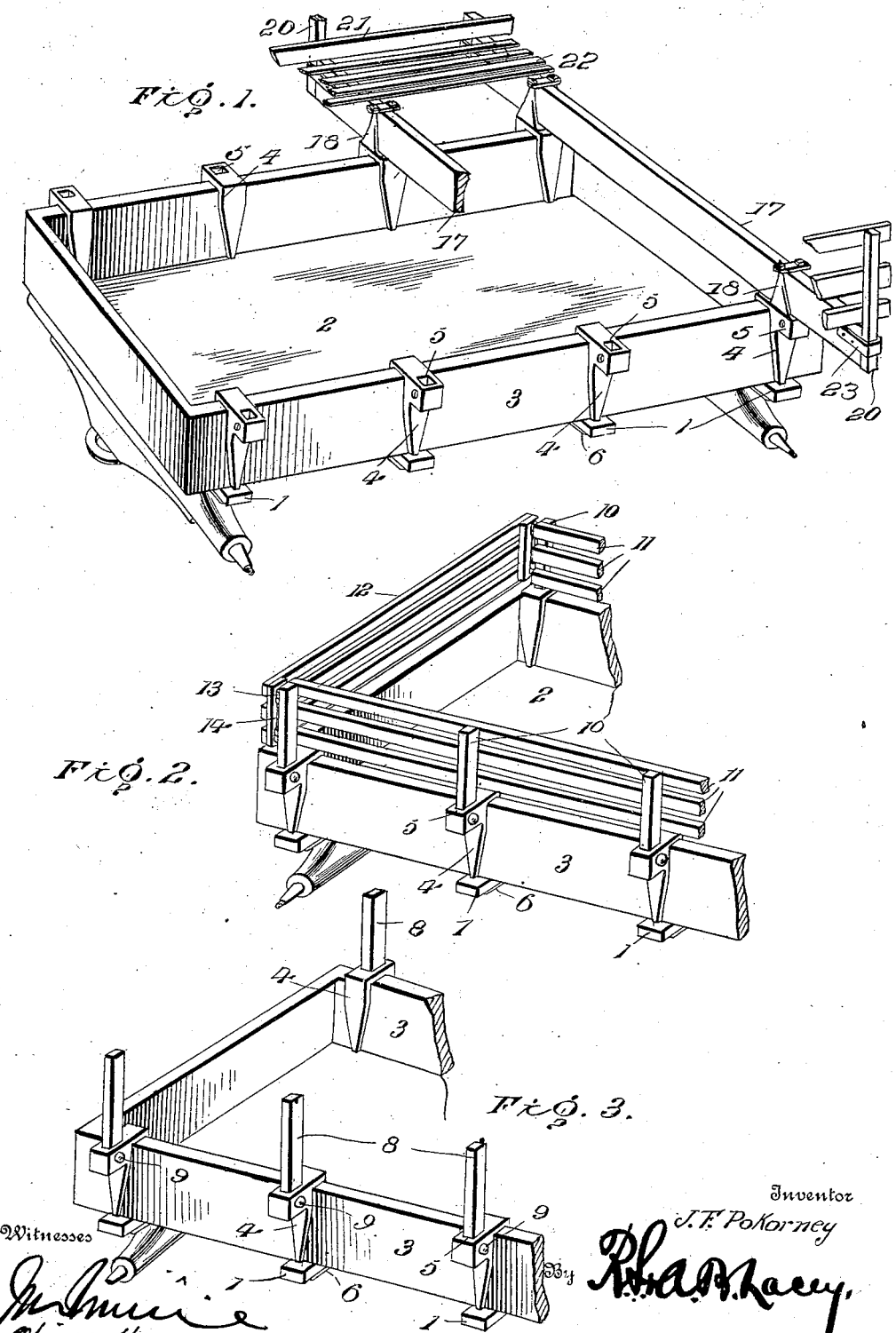

UNITED STATES PATENT OFFICE.

JOSEPH F. POKORNEY, OF HUTCHINSON, MINNESOTA.

RACK FOR FARM-WAGONS.

No. 884,679.

Specification of Letters Patent.

Patented April 14, 1908.

Application filed March 5, 1907. Serial No. 360,724.

*To all whom it may concern:*

Be it known that I, JOSEPH F. POKORNEY, citizen of the United States, residing at Hutchinson, in the county of McLeod and State of Minnesota, have invented certain new and useful Improvements in Racks for Farm-Wagons, of which the following is a specification.

This invention has relation to the bed of wagons designed chiefly for use of farmers and which may be readily converted into a rack for hay, stock, or wood, or which may be used as a wagon body for hauling grain, potatoes, or other farm products.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of the body forming the bottom portion of the several racks or wagon box, according to the adaptation of the invention, having portion of the hay rack in place. Fig. 2 is a perspective view of the invention adapted for use as a stock rack. Fig. 3 is a detail view showing the manner of adapting the invention for use as a wood rack. Fig. 4 is a detail view showing the invention adapted for use as a wagon box. Fig. 5 is a sectional detail of the iron admitting of converting the bed into the several uses hereinbefore indicated, showing the same fitted to a cross-bar and a side of the bed. Fig. 6 is a sectional view showing the relation of the parts when the hay rack is in place.

Corresponding and like parts are referred to in the following description and indicated in all the views of the drawings by the same reference characters.

The bed is adapted to be fitted to the running gear of any make, or type of vehicle for farm use and comprises a bottom and sides. The bottom comprises cross bars 1 and boards 2. The cross bars 1 act as cleats and stiffen and strengthen the bottom and receive the irons which support the sides 3 and the different attachments, by means of which the bed is converted into the different racks, or the wagon box, as hereinbefore specified. The cross bars 1 are provided at opposite ends with the irons, each of the latter consisting of a clip 4 and a socket 5, the latter being arranged upon the outer side of the clip and projecting horizontally therefrom and having a vertical opening, or space to receive the several stakes forming the inclosing sides.

The clip 4 is of substantially U form, the lower ends of its side members being reduced to pass through openings near the ends of the cross bars 1 and having their projecting ends threaded to pass through a yoke 6 and receive clamp nuts 7. The clips 4 may be of any length depending upon the height of the sides 3 so as to embrace said sides and firmly secure them to the bottom of the bed. The sockets 5 are arranged exterior to the sides 3 to receive lower ends of the stakes attached to the outer faces of the inclosing sides of the several racks or wagon box, thereby admitting of said sides resting upon the sides 3 as indicated most clearly in Figs. 2 and 4. The sockets 5 are preferably an integral part of the clips, although they may be formed separate therefrom and attached thereto in any substantial way if found advantageous in manufacture.

To convert the bed into a wood rack, it is necessary only to insert stakes 8 in the sockets 5, said stakes being retained in place by means of pins 9 which are passed through registering openings formed in the sides of the sockets and the lower ends of the stakes.

To convert the bed into a hay rack, extension sides are fitted to the sides 3. These extension sides consist of stakes 10 and strips 11 spaced apart and attached to the stakes 10. The stakes are provided in any number and correspond in position to the irons of the bed to admit of the lower ends of the stakes being fitted into the sockets 5 of the clips 4, the stakes being secured in said sockets by pins 9 or in any convenient way.

To convert the bed into a stock rack, extension sides similar to those provided for the hay rack are fitted to the sides 3 and other sides 12 close the spaces formed between the ends of the said extension sides. Eyes 13 are provided at the ends of the several inclosing sides and arranged in upper and lower pairs and are adapted to receive rods 14 which are passed therethrough so as to secure the sides when closed. Either side 12 is adapted to swing outward at either end by withdrawing one of the rods 14, the other rod forming a pintle, or axis upon which the side is adapted to swing as a gate, thereby admitting of stock entering or leaving the rack. This is clearly indicated in Fig. 2.

To convert the bed into a wagon box, the extension sides are made solid, or closed, the side boards 15 being provided with stakes 10 which are fitted into the sockets 5 of the aforementioned irons in the manner stated. The end gates 16 closing the spaces between the ends of the wagon-box sides may be secured in place in any well-known manner common in wagon body structures.

From the foregoing, it will be understood that the vehicle running gear provided with a bed constructed in accordance with the invention may be readily converted into the several uses herein stated, thereby enabling the farmer to adapt his wagon for any special use as for hauling stock, wood, grain, or other commodity at a comparatively slight cost and without necessitating removal of the usual body, or box and substitution therefor of the several racks.

As shown in Figs. 1 and 6, the bed is adapted for a hay rack by placing bars 17 upon the bed, said bars resting upon the upper edges of the sides 3 and projecting beyond the latter according to the required width of the rack. Clips 18 attached to end portions of the bars 17 are provided at their lower ends with projecting portions 19 of a size to snugly fit within the sockets 5. Clips 23 are fitted to the ends of the bar 17 and receive the lower ends of stakes 20 of the side pieces of the rack, said stakes being connected by strips 21. To prevent the hay or straw from dropping through the spaces formed between the end portions of the bars 17 projecting beyond the sides 3, strips 22 are secured to said projecting ends and are spaced apart a distance to support the hay or like material.

Having thus described the invention, what is claimed as new is:

1. A bed for vehicle running gear, the same comprising a bottom and sides and irons connecting the sides to the bottom, each iron consisting of a clip of U-form having its members extended along and embracing opposite faces of the said sides, and having the lower ends of the said members reduced and threaded and passed through openings in the aforesaid bottom, a yoke and clamp members fitted to the threaded ends of the members, and a vertical socket integral with and arranged at the upper end of the clip to receive a stake.

2. In combination, a vehicle bed comprising a bottom and sides, U-clips 4 embracing opposite faces of the sides and secured at their lower ends to the bottom and having integral vertical sockets at their upper ends, bars resting upon the upper edges of said sides and having their end portions projecting beyond the same, clips embracing opposite sides of said bars and connected thereto and having projecting portions to enter the sockets of the clips 4, other clips 23 attached to the ends of the said bars, stakes inserted in said clips 23, and strips connecting the stakes.

In testimony whereof I affix my signature in presence of two witnesses.

JOSEPH F. POKORNEY. [L. S.]

Witnesses:
FRANK MICKA,
TONY POKORNEY.